Oct. 9, 1928.
J. GYSELS
1,686,747
TORCH SOLDERING IRON
Filed July 28, 1927
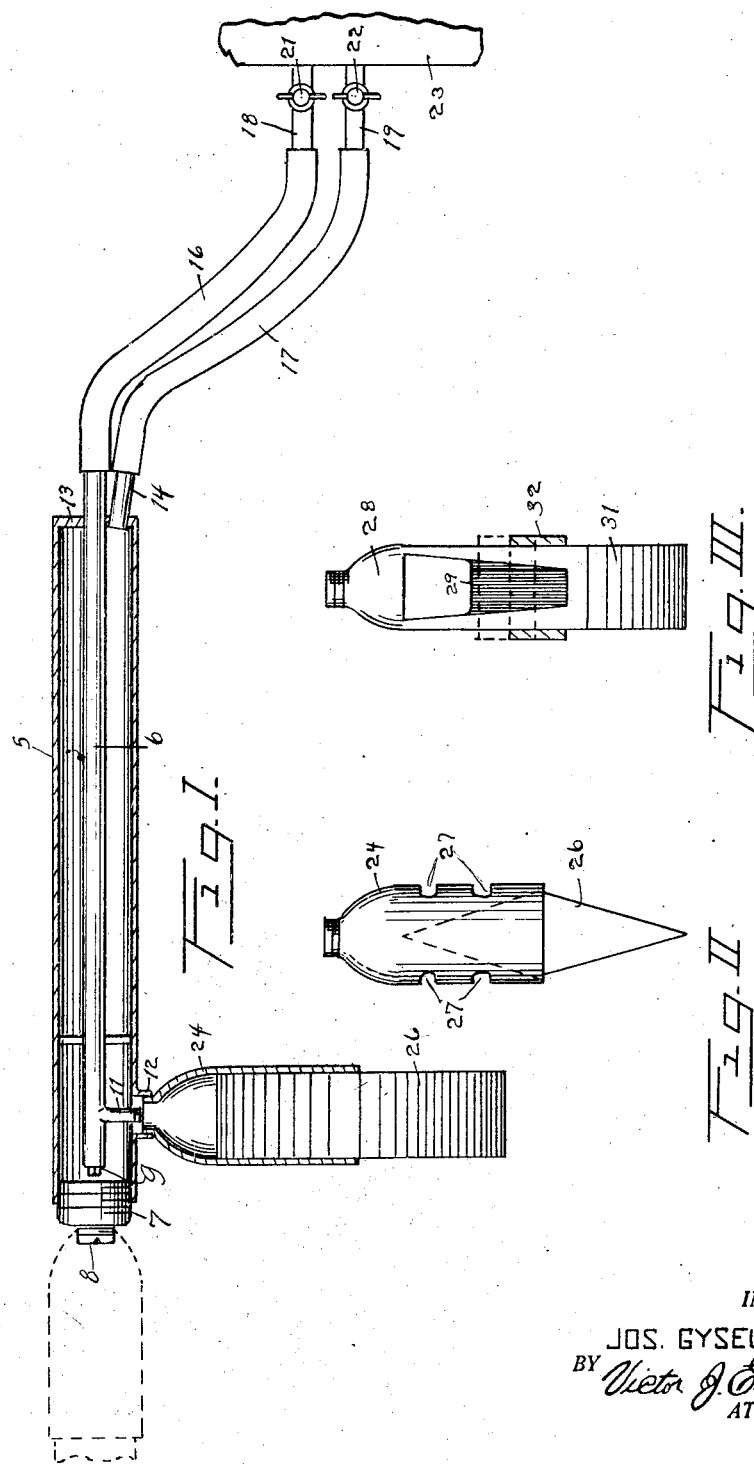
INVENTOR.
JOS. GYSELS
BY
ATTORNEYS.

Patented Oct. 9, 1928.

1,686,747

UNITED STATES PATENT OFFICE.

JOSEPH GYSELS, OF SAN FRANCISCO, CALIFORNIA.

TORCH SOLDERING IRON.

Application filed July 28, 1927. Serial No. 209,076.

This invention relates to improvements in soldering irons and has particular reference to a gas iron of the torch type.

The principal object of this invention is to produce a soldering iron wherein the iron is kept at a desired temperature by a flame maintained within the iron.

Another object is to produce a device of this character which may be used for side soldering or end soldering.

Another object of this invention is to produce a device of this character which is economical to manufacture, and therefore well within the purchase price of the average consumer.

Other objects and advantages will be apparent during the course of the following description.

In the accompanying drawings forming a part of this specification, and in which like numerals are employed to designate like parts throughout the same, Figure I is a vertical cross-section of my device as the same would appear in use when side soldering, Figure II is a side elevation of one of my preferred forms of soldering tip, and Figure II is a side elevation of a modified form of soldering tip showing the controlling ring in cross-section.

In shops where a large amount of soldering is necessary, much time is lost through the constant changing of soldering irons which are heated in an ordinary open flame. This method also serves to burn the soldering tips and consequently the same are constantly requiring retining. With my device I have provided a soldering iron wherein ordinary gas and air are used for the purpose of directing a flame onto the tip in such a manner that the same will remain in a proper heated condition.

In the accompanying drawings wherein for the purpose of illustration is shown a preferred embodiment of my invention, the numeral 5 designates a pipe having centrally positioned therein a gas pipe 6. The pipe 5 carries a plug 7 the end of which carries a plug 8, the purpose of which will be later seen.

The pipe 6 carries a plug 9 and the offset tip 11. This tip 11 is so positioned as to be centrally disposed with relation to a boss 12 formed on the pipe 5. The end of the pipe 5 opposite to that closed by the plug 7, is sealed as shown at 13 and has the pipe 6 extending therethrough as well as a pipe 14.

Flexible hose is employed as shown at 16 and 17 for the purpose of joining the pipes 6 and 14 to the pipes 18 and 19, respectively, the pipe 19 being a gas pipe and the pipe 18 being a compressed air pipe for carrying the compressed air through the hose 16 then through the pipe 6 to the tip 11. These pipes each have a valve as shown at 21 and 22, the purpose of which is obvious.

These pipes may be secured to the wall or work bench convenient to the work. The bench is shown in fragment as at 23.

At 24 I have shown a holder adapted to be screwed into the boss 12. This holder carries a copper soldering tip 26 which may be of any convenient form adapted to accomplish the work being done.

Openings 27 are formed in the side of the holder, which openings permit the products of combustion to escape as will be later described.

In the modified form shown in Figure III, the holder and soldering tip are made in one piece, and in such a manner that the flame coming through the neck 28 will impinge upon a division plate 29 and cause the flame to pass to both sides of the soldering tip 31.

In order to control the flame, I provide a sliding ring 32 to be used as shown in dotted line position of Figure III, when it will be apparent that the flame will engage the inside of the ring. When the ring is moved to the dotted line position of this figure, the flame will pass down the sides of the division wall and beneath the bottom of the ring, thereby carrying the flame much nearer to the point, than would happen otherwise.

When it is desired to employ the soldering iron for end soldering the holder is unscrewed from the boss 12 and the tip 11 is plugged as well as the boss 12. By now unscrewing the plug 8 and the plug 9, the holder may be screwed into place.

By now turning on the valve 22, it will be apparent that the gas issuing through the pipe 19 will pass through the pipe 17 and then through 14 and in such a manner as to heat the tip thereof.

It will thus be seen that I have provided a very simple device for accomplishing the objects herein set forth.

It is to be understood that the form of my invention herewith shown and described is to be taken as a preferred example of the same, and that various changes relative to the shape, size, material and arrangement of parts may be resorted to without departing from the spirit of the invention or the scope of the subjoined claims.

Having thus described my invention, I claim:—

1. In a soldering iron, a tubular member, a pipe positioned within said tubular member, said tubular member having a plug positioned therein, a second plug positioned within said first plug, a boss formed on said tubular member, an offset tip formed on said pipe and positioned so as to discharge through said boss, a holder secured to said boss, a tip secured to said holder, and means for delivering gas to said tubular member and means for delivering air to said pipe.

2. In a device of the character described, a pipe having one end closed, a second pipe positioned within said first mentioned pipe and extending through the closed end of said first mentioned pipe, means for delivering gas to said first mentioned pipe, a plug secured in the opposite end of said first mentioned pipe from said closed end, a second plug positioned within said first mentioned plug, a third plug secured in said second mentioned pipe, a holder adapted to be secured to said first mentioned pipe in such a manner that air issuing from said second mentioned pipe will pass into said holder, for the purpose specified.

In testimony whereof I affix my signature.

JOSEPH GYSELS.